United States Patent
Nassar et al.

(10) Patent No.: US 11,165,776 B2
(45) Date of Patent: Nov. 2, 2021

(54) METHODS AND SYSTEMS FOR MANAGING ACCESS TO COMPUTING SYSTEM RESOURCES

(71) Applicant: INTERNATIONAL BUSINESS MACHINES CORPORATION, Armonk, NY (US)

(72) Inventors: Nader M. Nassar, Yorktown Heights, NY (US); Gordan G. Greenlee, Endicott, NY (US); Raghu Dev, Reston, VA (US); Sudheer Kotilingala, Srikalahasti (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 348 days.

(21) Appl. No.: 16/115,193

(22) Filed: Aug. 28, 2018

(65) Prior Publication Data

US 2020/0076806 A1    Mar. 5, 2020

(51) Int. Cl.
*H04L 29/06*    (2006.01)
*H04L 29/08*    (2006.01)

(52) U.S. Cl.
CPC ........ *H04L 63/0892* (2013.01); *H04L 63/101* (2013.01); *H04L 67/22* (2013.01)

(58) Field of Classification Search
CPC .............. H04L 63/0892; H04L 63/101; H04L 63/0815; H04L 63/102; H04L 63/105; H04L 63/10; H04L 67/22; H04L 67/10; H04L 67/306; G06F 11/34; G06F 21/604

USPC .......................................................... 726/5
See application file for complete search history.

(56) References Cited

U.S. PATENT DOCUMENTS

| | | | |
|---|---|---|---|
| 5,911,143 A | 6/1999 | Deinhart et al. | |
| 6,308,274 B1 * | 10/2001 | Swift | G06F 21/604 710/200 |
| 7,529,931 B2 | 5/2009 | Vasishth et al. | |
| 8,402,514 B1 | 3/2013 | Thompson et al. | |
| 8,677,446 B2 | 3/2014 | De Peuter et al. | |
| 8,769,642 B1 * | 7/2014 | O'Neill | H04L 63/102 726/5 |
| 9,300,671 B1 * | 3/2016 | Barak | H04L 63/083 |
| 9,460,303 B2 | 10/2016 | Macleod et al. | |
| 9,509,672 B1 * | 11/2016 | Barak | H04L 63/0815 |
| 9,529,993 B2 * | 12/2016 | Kapadia | G06F 21/40 |
| 9,531,727 B1 * | 12/2016 | Himberger | H04L 63/102 |
| 9,659,166 B2 * | 5/2017 | Doddy | H04L 63/102 |
| 9,781,102 B1 | 10/2017 | Knjazihhin et al. | |
| 10,069,914 B1 * | 9/2018 | Smith | H04L 63/0428 |
| 10,237,252 B2 * | 3/2019 | Nandyala | H04L 63/08 |
| 10,264,026 B2 * | 4/2019 | Barboi | H04L 63/108 |

(Continued)

*Primary Examiner* — Samson B Lemma
(74) *Attorney, Agent, or Firm* — Griffiths & Seaton PLLC (57) ABSTRACT

Embodiments for managing for managing access to computing system resources are described. A list of privileged users having access to a computing system privilege is received. The computing system privilege is associated with a set of privilege credentials. The receiving of a first set of credentials and a second set of credentials from a user attempting to access the computing system privilege is detected. The user is caused to be granted access to the computing system privilege only if the first set of credentials matches the set of privilege credentials and the second set of credentials is associated with one of the privileged users.

21 Claims, 8 Drawing Sheets

(56) References Cited

U.S. PATENT DOCUMENTS

| | | | | |
|---|---|---|---|---|
| 10,977,364 B2* | 4/2021 | Harris | ............. | G06F 21/604 |
| 2002/0147801 A1 | 10/2002 | Gullotta et al. | | |
| 2005/0015628 A1* | 1/2005 | Narayanan | ............. | G06Q 20/102 |
| | | | | 726/19 |
| 2008/0052777 A1* | 2/2008 | Kawano | ............. | H04L 9/088 |
| | | | | 726/18 |
| 2010/0188684 A1* | 7/2010 | Kumara | ............. | G06F 21/608 |
| | | | | 358/1.14 |
| 2013/0232541 A1* | 9/2013 | Kapadia | ............. | G06F 21/40 |
| | | | | 726/1 |
| 2014/0310769 A1* | 10/2014 | O'Neill | ............. | H04L 63/102 |
| | | | | 726/1 |
| 2015/0180894 A1* | 6/2015 | Sadovsky | ............. | H04L 67/22 |
| | | | | 726/22 |
| 2017/0012986 A1* | 1/2017 | Himberger | ............. | H04L 63/08 |
| 2017/0012990 A1* | 1/2017 | Himberger | ............. | H04L 63/104 |
| 2018/0373887 A1* | 12/2018 | Smith | ............. | G06F 3/0605 |
| 2019/0121972 A1* | 4/2019 | Norvill | ............. | G06F 21/316 |
| 2019/0258799 A1* | 8/2019 | Harris | ............. | H04L 63/101 |

* cited by examiner

METHODS AND SYSTEMS FOR MANAGING ACCESS TO COMPUTING SYSTEM RESOURCES

BACKGROUND OF THE INVENTION

Field of the Invention

The present invention relates in general to computing systems, and more particularly, to various embodiments for managing access to computing system resources.

Description of the Related Art

In computing networks and systems, there are often varying levels or tiers of accessibility to resources (e.g., accounts) for different users. For example, in a business-related computing system, most of the employees may have "regular" user accounts that only allow the employees access to relatively "low level" resources in the system, while some employees, such as those working on particular projects, managers, executives, etc. may have "privileged" accounts that allow them access to shared or higher level (e.g., "elevated" or more sensitive) resources, perhaps in addition to their regular user account. For instance, some users (e.g., those working on a particular project) may have access to a "shared account," which may be utilized by multiple users, while managers may have access to an "elevated account" that provides them with access to resources deemed to be inappropriate for most employees.

In systems with such (e.g., shared and/or elevated) accounts, it is typically the case that there is no way to track exactly who has accessed the account and/or what actions were taken while the account was accessed. This is often because a user only needs the credentials (e.g., user/account name and password) associated with the account and is not required to provide any sort of proof of his/her identity.

SUMMARY OF THE INVENTION

Various embodiments for managing access to computing system resources by one or more processors are described. In one embodiment, by way of example only, a method for managing access to computing system resources, again by one or more processors, is provided. A list of privileged users having access to a computing system privilege is received. The computing system privilege is associated with a set of privilege credentials. The receiving of a first set of credentials and a second set of credentials from a user attempting to access the computing system privilege is detected. The user is caused to be granted access to the computing system privilege only if the first set of credentials matches the set of privilege credentials and the second set of credentials is associated with one of the privileged users.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, in computing networks and systems, there are often varying levels or tiers of accessibility to resources (e.g., accounts) for different users. For example, in a business-related computing system, most of the employees may have regular "user accounts" that only allow the employees access to relatively "low level" resources in the system, while some employees, such as those working on particular projects, managers, executives, etc. may have accounts that allow them access to shared or higher level (e.g., more sensitive) resources, perhaps in addition to their regular user account.

For instance, some users (e.g., those working on a particular project) may have access to a "shared account," which may be utilized by multiple users. More particularly, a shared account may be an account that is shared or used by more than one individual and not associated with a particular individual. In contrast, user accounts are typically associated with a particular individual. In some instances, shared accounts are "owned" by a single individual but may be accessed by several people.

Similarly, some users (e.g., executives, managers, etc.) may have access to an "elevated account" (or privileged account), which allows for access to resources (e.g., functionality, data, etc.) that are considered to be relatively important to the extent that only particular users are allowed access. More particularly, an elevated account may be an account that is used by a single individual or shared by multiple individuals, which provides access to resources that are considered to be relatively "elevated" or "privileged," at least when compared to a regular user account with the system. As will be appreciated by one skilled in the art, the resources associated (only) with elevated accounts may vary in different scenarios. As with shared accounts, elevated accounts may or may not be owned by a single individual but may be accessed by several people in some instances.

In most systems utilizing shared and/or elevated accounts, the account is often created by, for example, a manager as a "non-person" account or record (e.g., an account that is not associated with a particular individual). The account "identification" (ID, user/account name, etc.) is created along with associated credentials (e.g., a password), which are "linked" to the account ID and may be sent to appropriate personnel (e.g., records department, administrators, etc.). The account information (e.g., ID and password) are sent/given to the individuals who are deemed appropriate to have access to the account.

Those individuals may then utilize and/or access the account and/or the resources associated with the account. In particular, those individuals may access the account without any traceability or accountability regarding the actions taken or their activities while logged into the account. Additionally, any individual who gains access to (or learns) the credentials, regardless of whether or not they are one of the individuals considered appropriate, may be able to access the account, again without any traceability. This may particularly be an issue when individuals leave the organization (e.g., business) in question and/or are reassigned, as the credentials for such accounts often go unchanged.

To address these needs, some embodiments described herein provide methods and systems for managing access to computing systems, or computing system resources or privileges, in which the users registered to access particular a privilege (e.g., a shared and/or elevated account) are granted access to the privilege only if they provide the credentials associated with the privilege (e.g., privilege username/ID and password), as well as credentials associated with them as individuals (e.g., personal username and password).

As such, in some embodiments, when an individual attempts to access the privilege, he/she will only be allowed to do so if their personal credentials match those of one of the authorized users of the privilege. After the individual is "logged in," his/her activity may be monitored and a record thereof may be generated and stored to allow the activity to be tracked and/or accounted for. In other words, in some embodiments, the use of the privilege is limited to registered users and the activity of the users while using the privilege may be traced (i.e., the methods and systems allow for the determining of which particular user performed which activities/actions).

In some embodiments, the use of the privilege is "locked" so that only users listed or registered as "privileged" (or authorized to access the privilege(s)) are granted access. Additionally, the methods and systems may allow only one authorized user to access the privilege at a time (i.e., an authorized user may be prevented from accessing the privilege if attempting to so while another authorized user is already logged on/in, even if he/she provides appropriate privilege and personal credentials). However, in some embodiments, multiple authorized users may be simultaneously allowed to access to the privilege.

It should be understood that as used herein, "computing system resources" or "computing system privileges" may refer to any aspect of functionality associated with a computing system, network, device, or node, which may be protected in some manner by one or more security protocols, such as by limiting access via a shared and/or elevated account, as described above. For example, a computing system resource (or privilege) may refer to the use of and/or access to particular data (and/or the ability to change the data) and/or applications of a computing system or network. As another example, the computing system resource may refer to the use of a particular computing device (e.g., a laptop intended to be used by several people and restricted from use by other people).

It should also be understood that "privileged users" may refer to individuals who have been deemed suitable to have access to the "privileged" resources (e.g., the individuals intended to have access to a shared and/or elevated account). For example, the privileged users may include employees of a company who are working on a particular project or relatively high-ranking employees (e.g., managers, administration, etc.). In contrast, "authorized users" may refer to all users of the computing system, such as those who are intended to have relatively limited access to the computing system and those users who are intended to (also) have access to certain computing system resources or privileges (e.g., the resources/privileges associated with the shared and/or elevated account(s). In other words, privileged users may be users (or authorized users) who are intended to have access to additional resources/privileges compared to "regular" authorized users.

In particular, in some embodiments, a method for managing access to computing system resources by one or more processors is provided. A list of privileged users having access to a computing system privilege is received. The computing system privilege is associated with a set of privilege credentials. The receiving of a first set of credentials and a second set of credentials from a user attempting to access the computing system privilege is detected. The user is caused to be granted access to the computing system privilege only if the first set of credentials matches the set of privilege credentials and the second set of credentials is associated with one of the privileged users.

A record of activity of the user while the user has access to the computing system privilege may be generated. The record of the activity may be caused to be stored.

The list of privileged users may include a plurality of privileged users. The list of privileged users may include only a portion of a list of authorized users having access to the computing system.

The second set of credentials may be determined to be associated with an authorized user of the computing system that is not a privileged user. The user may be caused to be prevented from accessing the computing system privilege. A second user may be caused to be prevented from accessing the computing system privilege while the user has access to the computing system privilege.

If the first set of credentials does not match the privilege set of credentials and/or the second of set credentials is not associated with one of the privileged users, a signal representative thereof may be generated.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
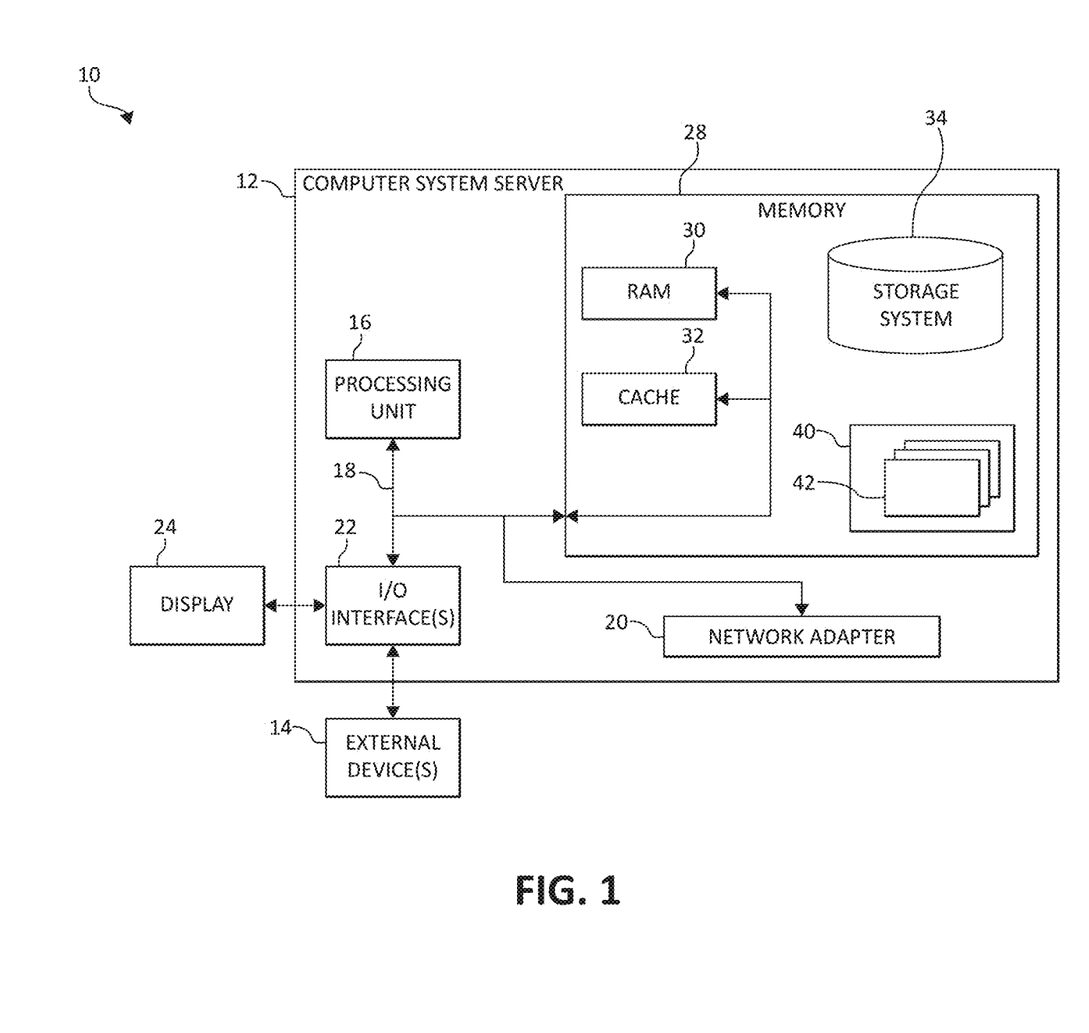
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices (e.g., mobile phones, tablets, PDAs, etc.), minicomputer systems, mainframe computer systems, and distributed cloud computing environments that include any of the above systems or devices, and the like. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
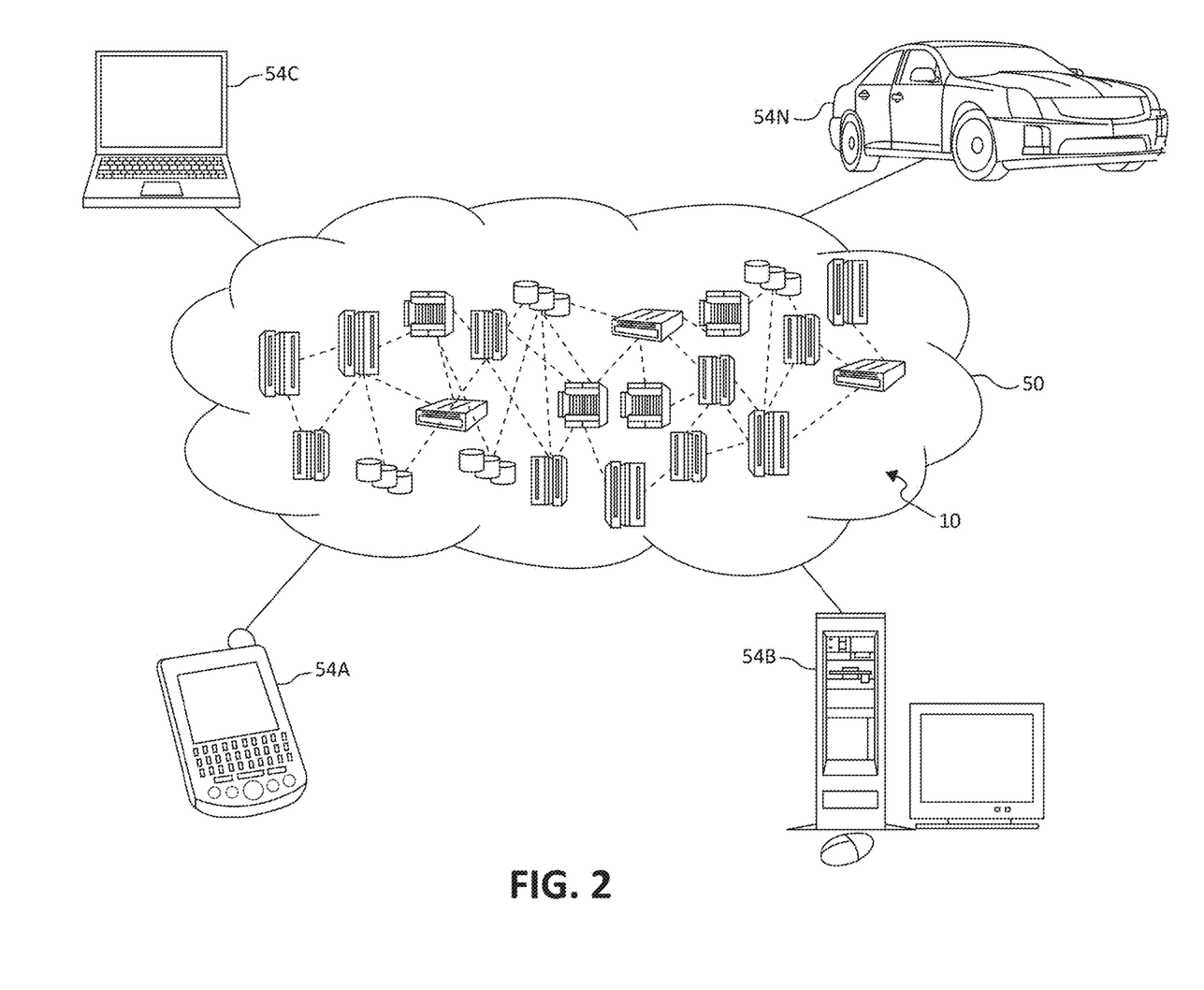
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
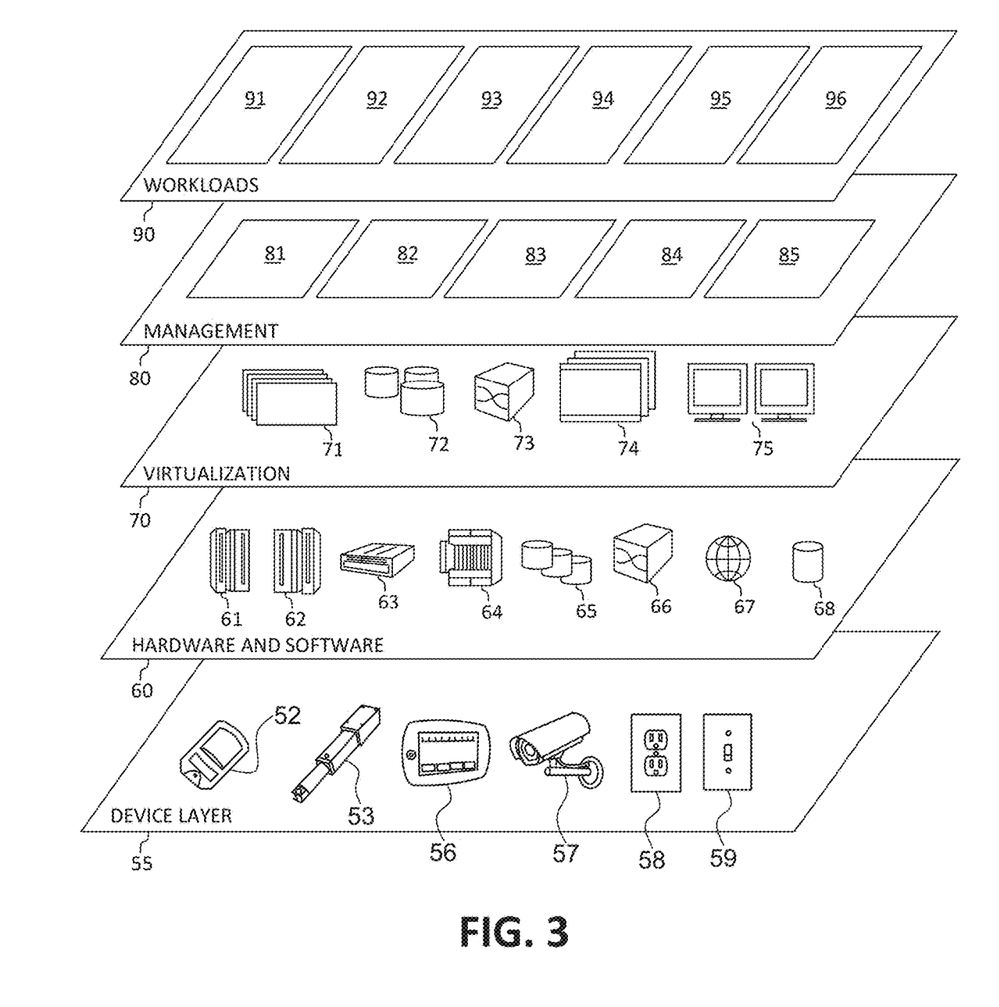
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing access to computing system resources as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, some embodiments described herein provide methods and systems for managing access to computing system resources (or privileges). In some embodiments, the computing system has multiple authorized users (e.g., at least one authorized user) who has access to at least some resources thereof. A list of privileged users (e.g., at least one privileged user) is received (or created). The privileged users may be authorized users of the system, who are intended to have access to additional resources (i.e., "privileges") of the computing system compared to "regular" (e.g., lower level) authorized users, such as via a shared and/or elevated account. Credentials for the privilege(s) (e.g., an ID and password) are created and shared with the privileged users. The privileged users (e.g., only the users on the list) may access or utilize the privilege, but only if they (also) provide their personal credentials, such as their personal username and password associated with their regular account in the system. In some embodiments, after the privileged users are logged onto the system, their actions (or activity) are monitored or tracked and a record thereof is generated and stored. More particularly, their actions may be "linked" to their personal credentials so that a record of which privileged users performed which actions may be later determined.

Figure 4:
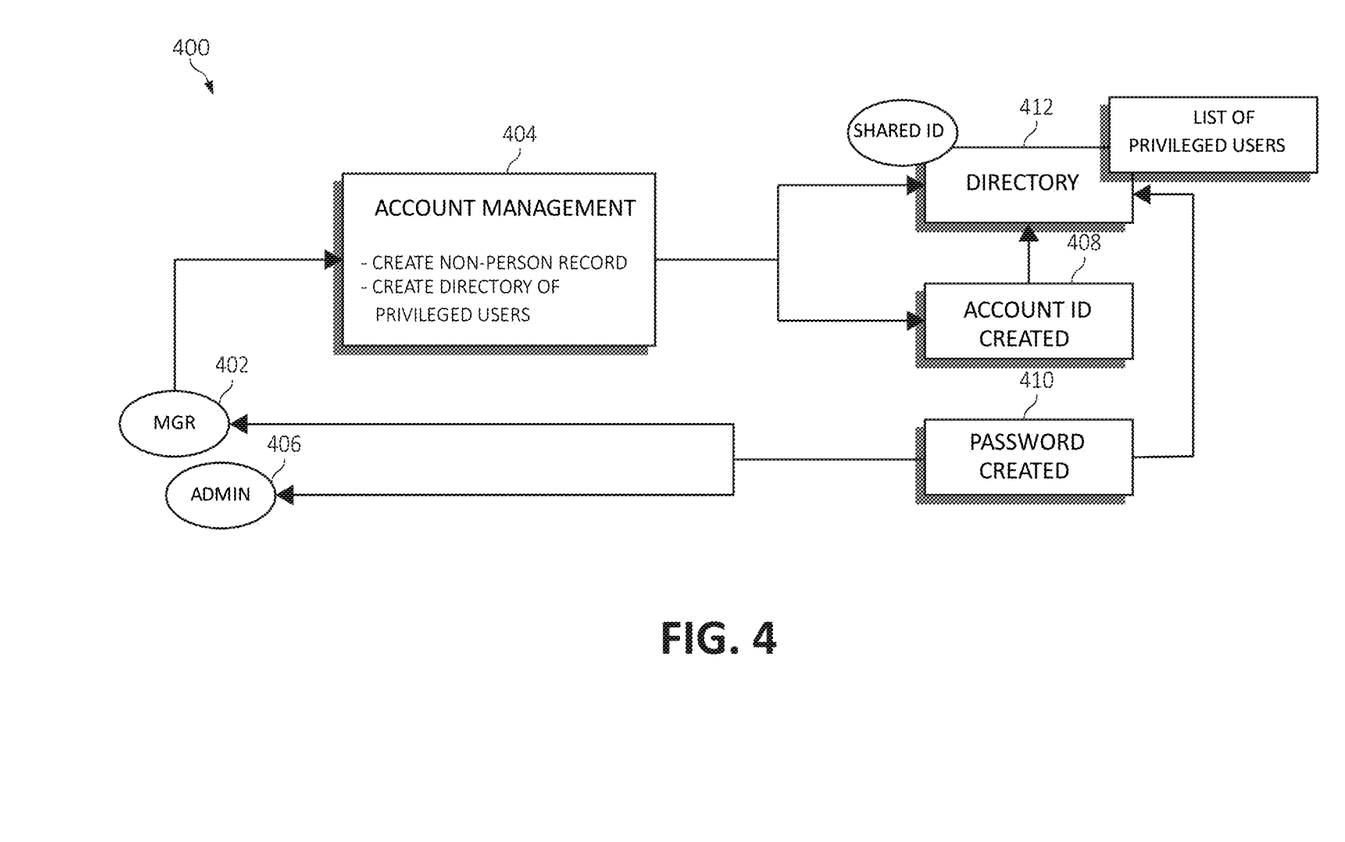
FIGS. 4-6 are block diagrams depicting various aspects of functionality according to embodiments of the present invention.
Figure 5:
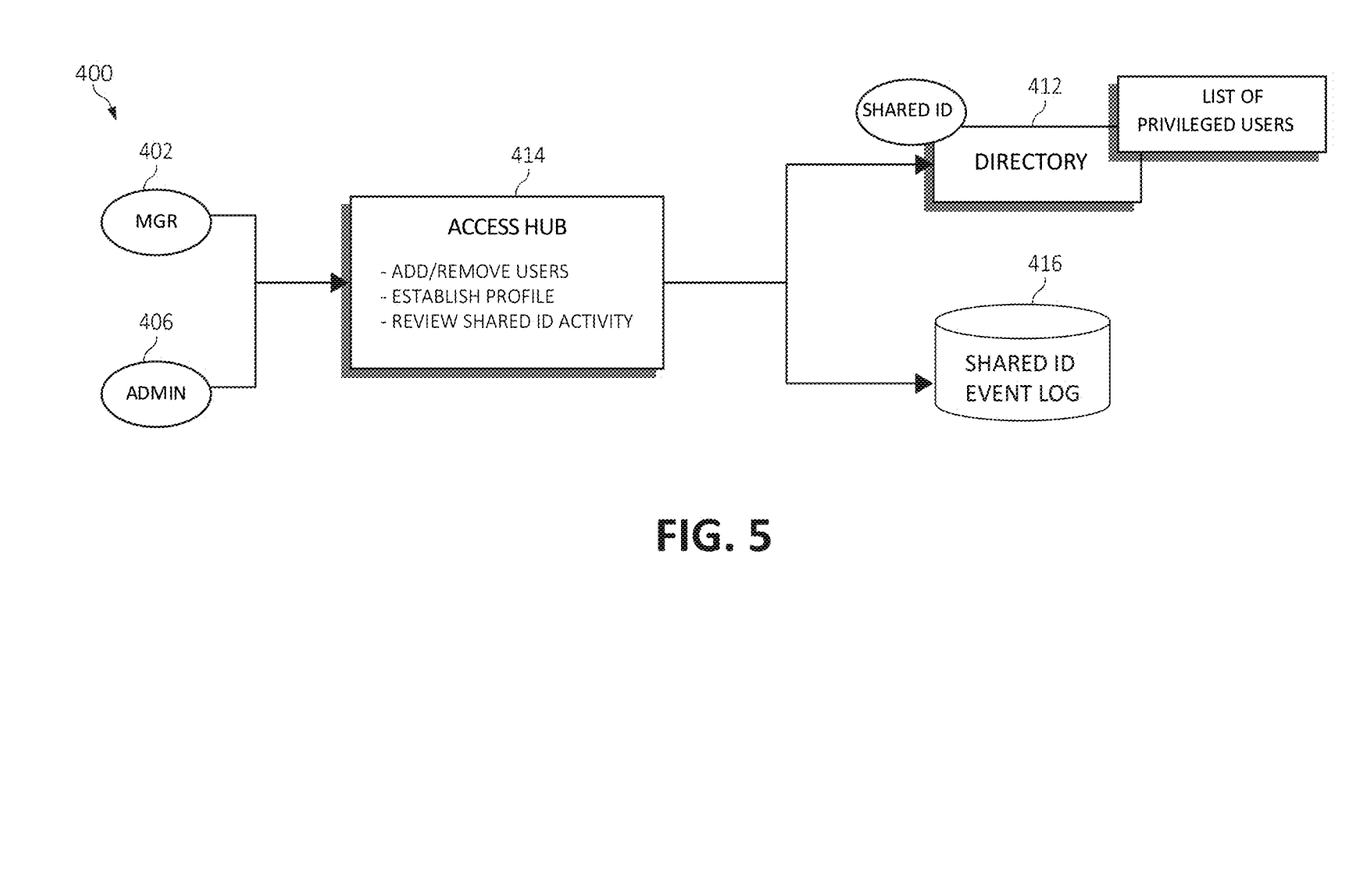
Figure 6:
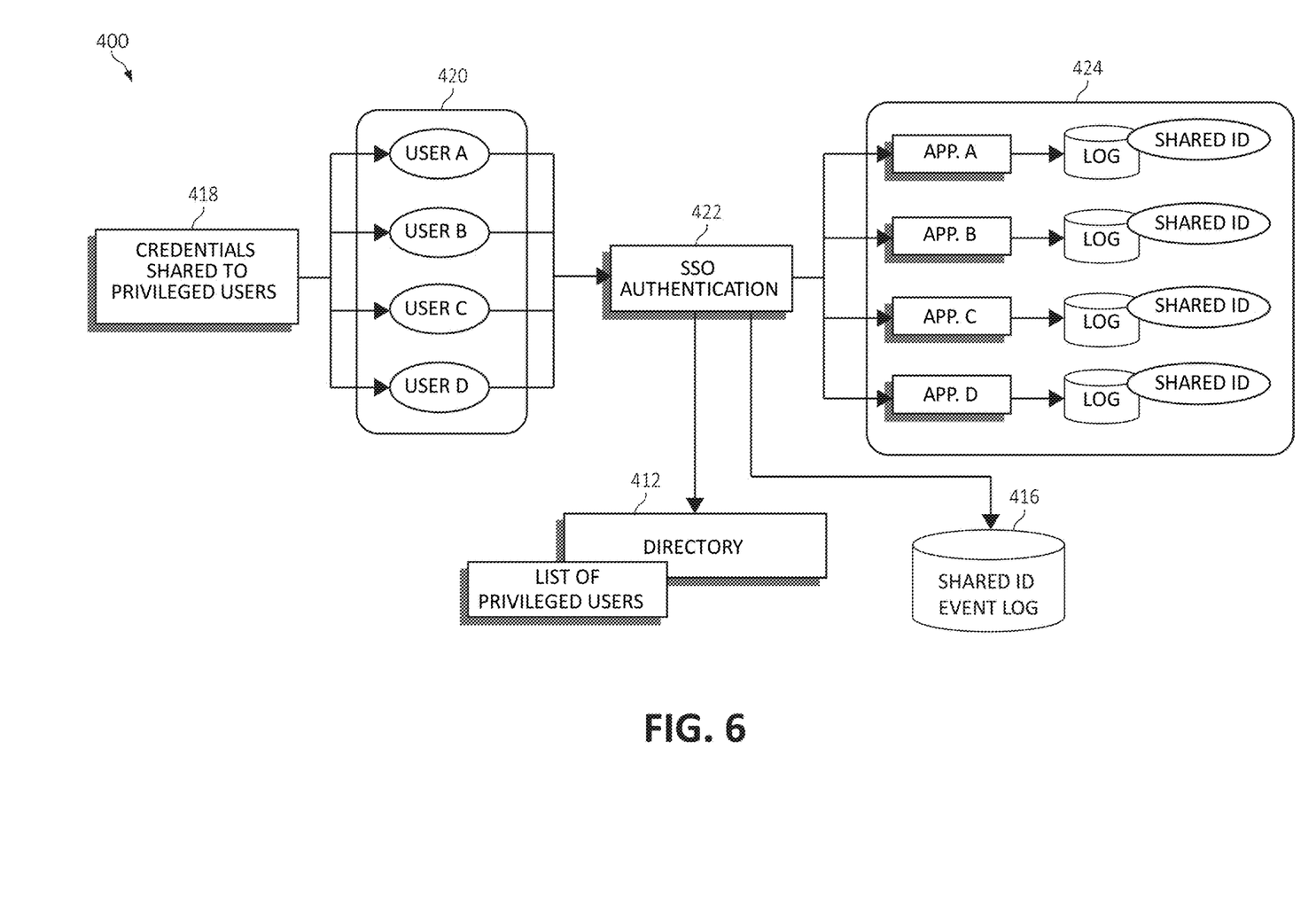

FIGS. 4-6 illustrates a method (and/or system) 400 (or at least portions thereof) for managing access to computing system resources according to some aspects of embodiments described herein. Referring specifically to FIG. 4, a manager 402 uses an account management system 404 to create a "non-person" record (i.e., not associated with one particular individual), such as a shared (and/or elevated) account. A list (or directory) of privileged users (e.g., authorized users of the respective computing system or network who have been determined to be appropriate to have access to the shared and/or elevated account) is created. The list of privileged users may be manually created by appropriate personnel (e.g., the manager 402) or may be generated automatically (e.g., by the account management system 404) based on, for example, information associated with the account (e.g., the type of project, the resources/privileges associated therewith, information related to the users, etc.). In some embodiments, the list of privileged users may (only) be changed by the manager 404, and perhaps an administrator 406 of the account. Otherwise, the list of privileged users may be "locked" so that no other individuals may make changes (e.g., adding and/or removing users).

In some embodiments, the users associated with the computing system, both the privileged users and the other authorized users, have personal credentials associated with a personal account. For example, each of the users may have a personal account which may be used to access at least some of the resources on the computing system (i.e., but not the privileged resources, such as those associated with the shared and/or elevated account). The personal credentials may include, for example, a personal username and a password.

Still referring to FIG. 4, at block 408, an ID (or username) is created and associated with (or linked to) the shared/elevated account (e.g., a shared, elevated, and/or privileged ID). The shared ID is sent to (and stored within) a directory 412, as is the list of privileged users. At block 410, a password for the account (e.g., a shared, elevated, and/or privileged password) is created and sent to the manager 402, the administrator 406, and the directory 412.

Referring now to FIG. 5, in some embodiments, the manager 402, and perhaps the administrator 406, may utilize an access hub 414 (e.g., an application associated with the account management system 404) to perform various functions related to the shared/elevated account. For example, users may be added and/or removed from the list of privileged users (and updated lists may be sent to the directory 412), the profile, policies, etc. of the account may be changed (e.g., the resources accessible through the account), and activity performed using the account may be reviewed by, for example, accessing a shared ID event log 416 (described in greater detail below).

Referring now to FIG. 6, at block 418, the credentials associated with the shared (and/or elevated) account, such as the account ID and password, are shared with or sent/provided to the privileged users. In the particular embodiment shown, the privileged users may be assumed to include Users A-D. The privileged users may then attempt to log onto or utilize the account at block 420.

In the depicted embodiment, the use of the shared account is protected by a single sign-on (SSO) authentication sequence, as is commonly understood, at block 422. In some embodiments, the user first provides credentials associated with the account or ID they wish to access. For example, if the user desires to access the shared account, he/she may first provide the shared ID name and the shared password after being appropriately prompted (e.g., via a pop-up window on a display device). If the credentials are correctly entered, the system may check the directory 412 for information associated with the appropriate account.

If the account is determined to be associated with privileged resources, such as being a shared and/or elevated account, a request for the user's personal credentials may be provided to the user. For example, the user may be provided with a message requesting the credentials associated with his/her personal user account (e.g., personal username and personal password). In some embodiments, a multi-factor authentication, such as two-factor authentication (2FA) process may be utilized, using, for example, a time-based one-time password (TOTP) authentication (e.g., by sending an appropriate one-time password to the user via email, text message, etc.). After the personal credentials of the user have been verified, the list of privileged users within the directory 412 may be checked for the user. If the user is found to be on the list of privileged users, the user is granted access to the (shared/elevated) account and the resources 424 associated with the account, such as Applications A-D, as shown in FIG. 6. If the user is not on the list of privileged users, the user is prevented from (or denied) access to the account. However, the user may be able to access his/her regular, personal user account on the system by provided the appropriate credentials.

In some embodiments, whenever a user logs onto (or signs into) the shared (and/or elevated) account and/or when a failed login occurs, the details thereof are stored in the shared ID event log 416. Additionally, details of the activity performed by the user may be tracked and stored in the event log 416. For example, if User B logs into the account and accesses utilizes Application C, various details of User B's activity may be stored, such as when the login occurs, which resources are utilized, and what actions are taken (i.e., by User B). As such, the manager 402 and/or the administrator (FIGS. 4 and 5) may then be able to review the activities of the privileged users on the shared account via the event log 416 and determine which users performed which actions.

Figure 7:
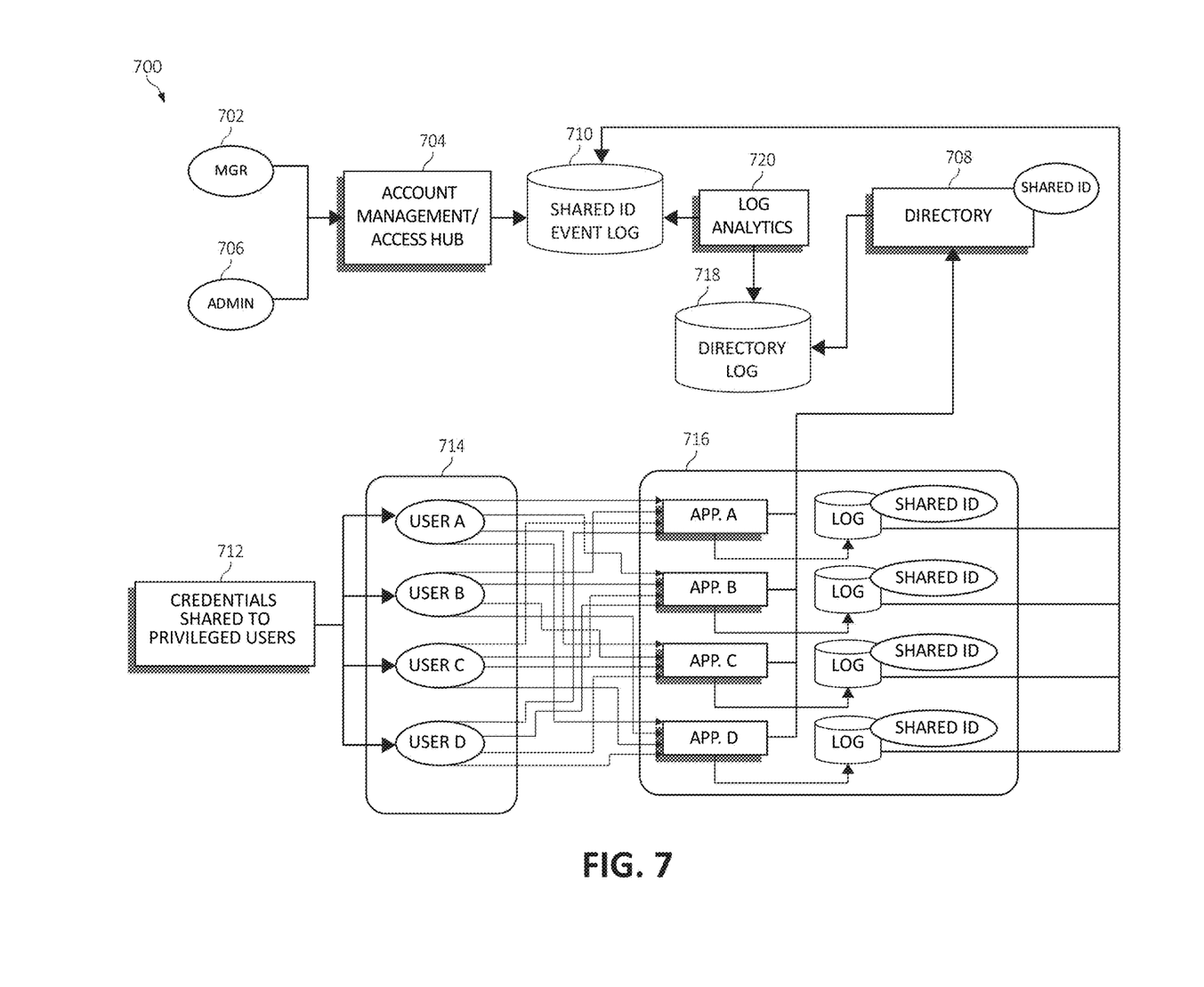
FIG. 7 is a block diagram depicting additional aspects of functionality according to an embodiment of the present invention.

FIG. 7 illustrates a method (and/or system) 700 (or at least portions thereof) for managing access to computing system resources according to some aspects of embodiments described herein. Similar to the method 400 shown in FIGS. 4-6, in the method 700 of FIG. 7, a manager 702 uses an account management system (and/or an access hub thereof) 704 to create a "non-person" record (i.e., not associated with one particular individual), such as a shared (and/or elevated) account. A list (or directory) of privileged users (e.g., authorized users of the respective computing system or network who have been determined to be appropriate to have access to the shared and/or elevated account) is created. The list of privileged users may be manually created by appropriate personnel (e.g., the manager 702) or may be generated automatically (e.g., by the account management system 704) based on, for example, information associated with the account (e.g., the type of project, the resources/privileges associated therewith, information related to the users, etc.). In some embodiments, the list of privileged users may (only) be changed by the manager 704, and perhaps an administrator 706 of the account. Otherwise, the list of privileged users may be "locked" so that no other individuals may make changes (e.g., adding and/or removing users).

An ID (or username) is created and associated with (or linked to) the shared/elevated account (e.g., a shared, elevated, and/or privileged ID). The shared ID is sent to (and stored within) a directory 708, as is the list of privileged users. A password for the account (e.g., a shared, elevated, and/or privileged password) is created and sent to the manager 702, the administrator 706, and the directory 708.

In some embodiments, the manager 702, and perhaps the administrator 706, may utilize the access hub of the account management system 704 to perform various functions related to the shared/elevated account. For example, users may be added and/or removed from the list of privileged users (and updated lists may be sent to the directory 708), the profile, policies, etc. of the account may be changed (e.g., the resources accessible through the account), and activity performed using the account may be reviewed by, for example, accessing a shared ID event log 710.

At block 712, the credentials associated with the shared (and/or elevated) account, such as the account ID and password, are shared with or sent/provided to the privileged users. In the particular embodiment shown, the privileged users may be assumed to include Users A-D. The privileged users may then attempt to log onto or utilize the account at block 714.

The user provides credentials associated with the account or ID they wish to access. For example, if the user desires to access the shared account, he/she may provide the shared ID name and the shared password. If the credentials are correctly entered, the system may check the directory 708 for information associated with the appropriate account.

If the account is determined to be associated with privileged resources, such as being a shared and/or elevated account, and the credentials provided by the user match the shared ID and the shared password, the user is granted access to the account and the resources 716 associated with the account, such as Applications A-D, as shown in FIG. 7. If the credentials provided by the user do not match those of the account, the user is prevented from (or denied) access to the account. However, the user may be able to access his/her regular, personal user account on the system by provided the appropriate credentials.

In some embodiments, whenever a user logs onto (or signs into) the account and/or when a failed login occurs, the details thereof are stored in a directory log 718 and details of the activity performed by the user may be tracked and stored in the shared ID event log 710. For example, if User B logs into the account and accesses utilizes Application C, various details of User B's activity may be stored, such as when the login occurs, which resources are utilized, and what actions are taken (i.e., by User B). As such, the manager 702 and/or the administrator 706 may then be able to review the activities of the shared account and determine which users performed which actions, perhaps using a log analytics module 720, and/or determine whether or not the shared account has been used in an appropriate and/or the intended manner. The log analytics module 720 may include and/or utilize, for example, a "cognitive analysis," a "cognitive neural network," "machine learning," "cognitive modeling," "predictive analytics," and/or "data analytics," as is commonly understood by one skilled in the art.

Figure 8:
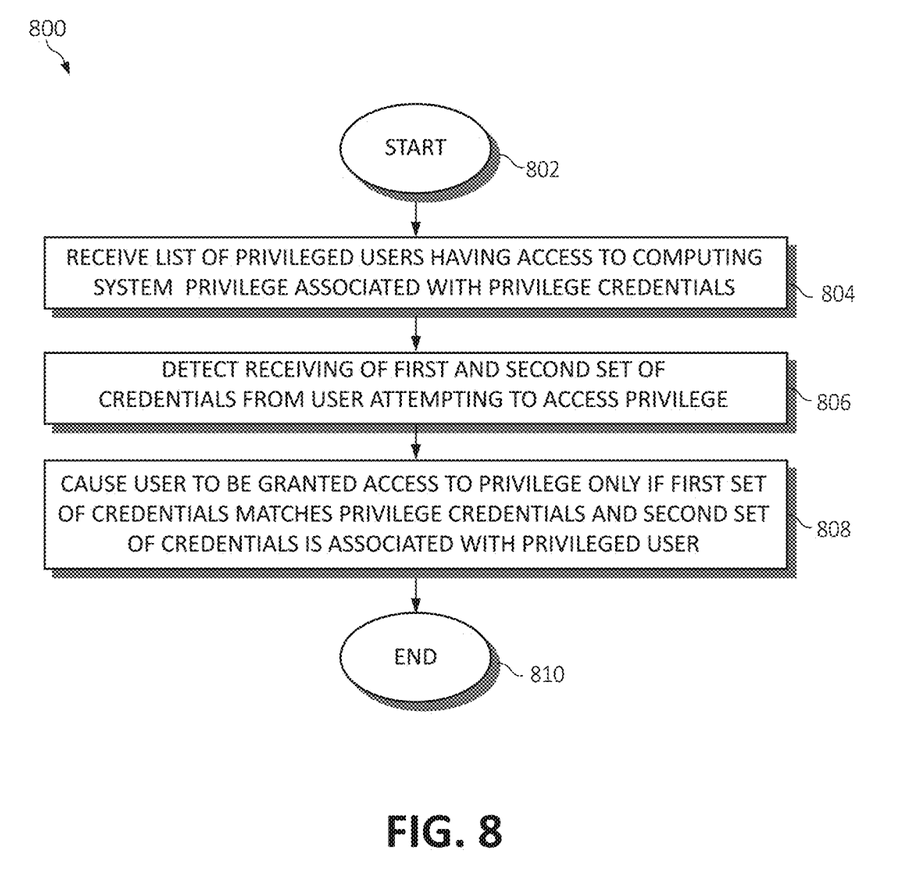
FIG. 8 is a flowchart diagram of an exemplary method for managing access to computing system resources according to an embodiment of the present invention.

Turning to FIG. 8, a flowchart diagram of an exemplary method 800 for managing access to computing system resources, in accordance with various aspects of the present invention, is provided. Method 800 begins (step 802) with, for example, a computing system privilege (or privileged resources), such as a shared and/or elevated account. The respective computing system may have multiple authorized users, and privileged users, deemed to be suitable for having access to the privilege, may be selected (i.e., selected from the authorized users).

A list of the privileged users having access to the computing system privilege is received (and/or retrieved and/or generated) (step 804). The computing system privilege is associated with a set of privilege credentials (e.g., a privilege ID/username and a privilege password). The list of privileged users may include a plurality of privileged users. The list of privileged users may include only a portion of a list of authorized users having access to the computing system.

The receiving of a first set of credentials and a second set of credentials from a user attempting to access the computing system privilege is detected (step 806). For example, each of the first and second sets of credentials may include an ID/username and a password.

The user is caused to be granted access to the computing system privilege only if the first set of credentials matches the set of privilege credentials and the second set of credentials is associated with one of the privileged users (step 808). In other words, in some embodiments, the user is only granted access to the computing system privilege if the user is able to provide the appropriate credentials for the privilege and personal credentials associated with a user on the list of privileged users. As such, if the second set of credentials is determined to be associated with an authorized user of the computing system that is not a privileged user, the user may prevented (or caused to be prevented) from accessing the computing system privilege. In some embodiments, a second user is prevented from accessing the computing system privilege while the (first) user has access to the computing system privilege (i.e., while the first user is logged onto/utilizing the privilege). If the first set of credentials does not match the privilege set of credentials and/or the second of set credentials is not associated with one of the privileged users, a signal representative thereof may be generated. A record of activity of the user while the user has access to the computing system privilege may be generated and stored.

Method 800 ends (step 810) with, for example, the user logging out/signing off from the computing system privilege. A manager or an administrator may then review the record of the activities of the privilege and determine which users performed which actions and/or determine whether or not the privilege has been used in an appropriate and/or the intended manner The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing access to computing system resources comprising:
    receiving a list of privileged users having access to a computing system privilege, wherein the computing system privilege is associated with a set of privilege credentials;
    detecting the receiving of a first set of credentials and a second set of credentials from a user attempting to access the computing system privilege, wherein the first set of credentials are associated with the computing system privilege and the second set of credentials are associated with the user, and wherein the receiving of the first set of credentials occurs simultaneously with or prior to the receiving of the second set of credentials such that information as to which particular one of the privileged users on the list of privileged users accessing the computing system privilege is unknown until after receiving the second set of credentials; and
    causing the user to be granted access to the computing system privilege only if the first set of credentials matches the set of privilege credentials and the second set of credentials is associated with one of the privileged users.

2. The method of claim 1, further comprising:
    generating a record of activity of the user while the user has access to the computing system privilege; and
    causing the record of the activity of the user to be stored.

3. The method of claim 1, wherein the list of privileged users comprises a plurality of privileged users.

4. The method of claim 1, wherein the list of privileged users includes only a portion of a list of authorized users having access to the computing system.

5. The method of claim 4, further comprising:
    determining that the second set of credentials is associated with an authorized user of the computing system that is not a privileged user; and
    causing the user to be prevented from accessing the computing system privilege.

6. The method of claim 1, further comprising causing a second user to be prevented from accessing the computing system privilege while the user has access to the computing system privilege.

7. The method of claim 1, further comprising, if the first set of credentials does not match the privilege set of credentials or the second of set credentials is not associated with one of the privileged users, generating a signal representative thereof.

8. A system for managing access to computing system resources comprising:
    a memory;
    at least one processor that
        receives a list of privileged users having access to a computing system privilege, wherein the computing system privilege is associated with a set of privilege credentials;
        detects the receiving of a first set of credentials and a second set of credentials from a user attempting to access the computing system privilege, wherein the first set of credentials are associated with the computing system privilege and the second set of credentials are associated with the user, and wherein the receiving of the first set of credentials occurs simultaneously with or prior to the receiving of the second set of credentials such that information as to which particular one of the privileged users on the list of privileged users accessing the computing system privilege is unknown until after receiving the second set of credentials; and
        causes the user to be granted access to the computing system privilege only if the first set of credentials matches the set of privilege credentials and the second set of credentials is associated with one of the privileged users.

9. The system of claim 8, wherein the at least one processor further:
    generates a record of activity of the user while the user has access to the computing system privilege; and
    causes the record of the activity of the user to be stored.

10. The system of claim 8, wherein the list of privileged users comprises a plurality of privileged users.

11. The system of claim 8, wherein the list of privileged users includes only a portion of a list of authorized users having access to the computing system.

12. The system of claim 11, wherein the at least one processor further:
    determines that the second set of credentials is associated with an authorized user of the computing system that is not a privileged user; and
    causes the user to be prevented from accessing the computing system privilege.

13. The system of claim 8, wherein the at least one processor further causes a second user to be prevented from accessing the computing system privilege while the user has access to the computing system privilege.

14. The system of claim 8, wherein the at least one processor further, if the first set of credentials does not match the privilege set of credentials or the second of set credentials is not associated with one of the privileged users, generates a signal representative thereof.

15. A computer program product for managing access to computing system resources by one or more processors, the computer program product comprising a non- transitory computer-readable storage medium having computer-readable program code portions stored therein, the computer-readable program code portions comprising:

an executable portion that receives a list of privileged users having access to a computing system privilege, wherein the computing system privilege is associated with a set of privilege credentials;

an executable portion that detects the receiving of a first set of credentials and a second set of credentials from a user attempting to access the computing system privilege, wherein the first set of credentials are associated with the computing system privilege and the second set of credentials are associated with the user, and wherein the receiving of the first set of credentials occurs simultaneously with or prior to the receiving of the second set of credentials such that information as to which particular one of the privileged users on the list of privileged users accessing the computing system privilege is unknown until after receiving the second set of credentials; and an executable portion that causes the user to be granted access to the computing system privilege only if the first set of credentials matches the set of privilege credentials and the second set of credentials is associated with one of the privileged users.

16. The computer program product of claim 15, wherein the computer-readable program code portions further include:

an executable portion that generates a record of activity of the user while the user has access to the computing system privilege; and an executable portion that causes the record of the activity of the user to be stored.

17. The computer program product of claim 15, wherein the list of privileged users comprises a plurality of privileged users.

18. The computer program product of claim 15, wherein the list of privileged users includes only a portion of a list of authorized users having access to the computing system.

19. The computer program product of claim 18, wherein the computer-readable program code portions further include:

an executable portion that determines that the second set of credentials is associated with an authorized user of the computing system that is not a privileged user; and an executable portion that causes the user to be prevented from accessing the computing system privilege.

20. The computer program product of claim 15, wherein the computer-readable program code portions further include an executable portion that causes a second user to be prevented from accessing the computing system privilege while the user has access to the computing system privilege.

21. The computer program product of claim 15, wherein the computer-readable program code portions further include an executable portion that, if the first set of credentials does not match the privilege set of credentials or the second of set credentials is not associated with one of the privileged users, generates a signal representative thereof.

* * * * *